(12) United States Patent
Jastrzebski

(10) Patent No.: US 11,289,970 B2
(45) Date of Patent: Mar. 29, 2022

(54) CONTROL DEVICE AND A METHOD FOR CONTROLLING AN ELECTRIC DRIVE

(71) Applicant: Lappeenrannan-Lahden teknillinen yliopisto LUT, Lappeenranta (FI)

(72) Inventor: Rafal Piotr Jastrzebski, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 380 days.

(21) Appl. No.: 16/496,489

(22) PCT Filed: Mar. 13, 2018

(86) PCT No.: PCT/FI2018/050180
§ 371 (c)(1),
(2) Date: Sep. 23, 2019

(87) PCT Pub. No.: WO2018/172606
PCT Pub. Date: Sep. 27, 2018

(65) Prior Publication Data
US 2020/0028409 A1 Jan. 23, 2020

(30) Foreign Application Priority Data

Mar. 22, 2017 (FI) .................................... 20175261

(51) Int. Cl.
*H02K 7/09* (2006.01)
*H02K 11/33* (2016.01)
(Continued)

(52) U.S. Cl.
CPC ........... *H02K 7/09* (2013.01); *F16C 32/0493* (2013.01); *F16C 32/0497* (2013.01); *H02K 3/24* (2013.01);
(Continued)

(58) Field of Classification Search
CPC . H02K 7/09; H02K 3/24; H02K 11/33; H02K 17/165; H02K 19/14; H02K 21/46;
(Continued)

(56) References Cited

U.S. PATENT DOCUMENTS

| 6,034,456 A | * | 3/2000 | Osama | ............... F16C 32/0497 310/112 |
| 2004/0090138 A1 | * | 5/2004 | Amrhein | ............. F16C 32/0493 310/429 |

(Continued)

FOREIGN PATENT DOCUMENTS

| CN | 101026348 A | 8/2007 |
| CN | 101217244 A | 7/2008 |

(Continued)

OTHER PUBLICATIONS

"New model of radial force determination in bearingless motor" for Blaise Lapotre (Year: 2015).*

(Continued)

*Primary Examiner* — Ahmed Elnakib
(74) *Attorney, Agent, or Firm* — Nixon & Vanderhye

(57) ABSTRACT

An electric drive comprises a bearingless electric machine, a converter, and a control device. The stator of the electric machine has a cage winding including bars connected to a conductor ring. The control device controls the converter to supply torque generating current components to the bars so that torque is generated in accordance with electric machine control and to supply levitation current components to the bars so that the rotor of the bearingless electric machine is levitated in accordance with levitation control. The cage winding allows the currents of the bars to be controlled so that different current sheet distributions can be generated so as to generate desired torque and magnetic force.

20 Claims, 5 Drawing Sheets

(51) Int. Cl.
*F16C 32/04* (2006.01)
*H02K 3/24* (2006.01)
*H02K 17/16* (2006.01)
*H02K 19/14* (2006.01)
*H02K 21/46* (2006.01)

(52) U.S. Cl.
CPC ........... *H02K 11/33* (2016.01); *H02K 17/165* (2013.01); *H02K 19/14* (2013.01); *H02K 21/46* (2013.01); *H02K 2201/03* (2013.01)

(58) Field of Classification Search
CPC ...... H02K 2201/03; H02K 3/12; H02K 16/00; F16C 32/0497; F16C 32/0493; H02P 25/22; H02P 27/04
USPC ........................................................ 310/90.5
See application file for complete search history.

(56) References Cited

U.S. PATENT DOCUMENTS

| | | | |
|---|---|---|---|
| 2008/0164697 A1* | 7/2008 | Schram | F03D 80/70 290/44 |
| 2011/0234129 A1 | 9/2011 | Shimizu et al. | |
| 2014/0028132 A1 | 1/2014 | Jansen et al. | |
| 2016/0173019 A1 | 6/2016 | Dajaku et al. | |

FOREIGN PATENT DOCUMENTS

| | | |
|---|---|---|
| CN | 102201769 A | 9/2011 |
| DE | 10 2005 032965 | 3/2007 |
| EP | 1 050 949 | 11/2000 |
| EP | 3118976 | 1/2017 |
| EP | 2 574 898 | 5/2018 |
| GB | 2505475 A | 3/2014 |

OTHER PUBLICATIONS

Search Report in Finnish Patent Application No. 20175261 dated Sep. 26, 2019.
Zhang and Luo, "Direct Control of Radial Displacement for Bearingless Permanent-Magnet-Type Synchronous Motors," IEEE Transactions on Industrial Electronics, vol. 56, No. 2, Feb. 2009, pp. 542-552.
Chiba et al., "A Novel Middle-Point-Current-Injection-Type Bearingless PM Synchronous Motor for Vibration Suppression," IEEE Transactions on Industry Applications, vol. 47, No. 4, 2011, pp. 1700-1706.
Nian et al., "Rotor Displacement Sensorless Control Strategy for PM Type Bearingless Motor Based on the Parameter Identification," 2009 International Conference on Electric Machines and Systems, 2009, 5 pages.
Office Action issued in Chinese Patent Application No. 201880019738.9 dated Mar. 30, 2021.
International Search Report, PCTFI2018/050180, dated Jun. 22, 2018.
Finnish Search Report, 20175261, dated Aug. 24, 2017.
Lapötre, Blaise & Takorabet, Noureddine & Meibody-Tabar, F. & Fontchastagner, Julien & Lateb, Ramdane & Silva, Joaquim. Mar. 2015. New Model of Radial Force Determination in Bearingless Motor. IEEE Transactions on Magnetics. 51. 1-4. 10.1109/TMAG.2014.2354536.
Li Bingnan et al: "Analysis and control of seven-phase permanent-magnet bearingless motor with single set of half-coiled winding", 2014 IEEE 23rd International Symposium on Industrial Electronics (ISIE), IEEE, Jun. 2014 (Jun. 2014), pp. 2080-2086, XP032624129,DOI: 10.1109/ISIE.2014.6864938 [retrieved on Jul. 24, 2014] equation 26; p. 5pp. 2084, right-hand column, lines bottom-part, paragraph chapter IV.B; figure 5 p. 2pp. 2081, left-hand column, lines upper-part, paragraph chapter II; figure 1.

* cited by examiner

CONTROL DEVICE AND A METHOD FOR CONTROLLING AN ELECTRIC DRIVE

FIELD OF TECHNOLOGY

The disclosure relates generally to magnetic levitation and torque generation in an electric drive. More particularly, the disclosure relates to a control device, to a method, and to a computer program for controlling an electric drive. Furthermore, the disclosure relates to an electric drive.

BACKGROUND

Magnetic levitation systems, such as e.g. active magnetic bearings "AMB", are commonly known in the art. Magnetic levitation systems are commonly utilized for supporting a rotating or oscillating object. Using magnetic levitation in rotating machinery results in for example: reduction of friction, oil-free operation, lower maintenance costs, and/or higher reliability when compared to traditional rotating machines with mechanical bearings. Combining functionalities for torque generation and magnetic levitation into one electric machine results in a shorter rotor and more affordable control and driving electronics than a traditional AMB rotor system which comprises separate AMB actuators in addition to an electric machine for generating torque. Electric machines providing combined torque generation and magnetic levitation functionalities are typically called bearingless electric machines although electric machines of the kind mentioned above are typically provided with mechanical safety bearings for supporting the rotor in a case of a failure in the magnetic levitation.

Publication Chiba, A. et al.: *A Novel Middle-Point-Current-Injection-Type Bearingless PM Synchronous Motor for Vibration Suppression*, Institute of Electrical and Electronics Engineers "IEEE" Transactions on Industry Applications, Vol. 47, No. 4, 2011 describes a stator winding structure for a middle-point-current-injection-type bearingless permanent magnet synchronous motor. The motor does not have additional windings for radial magnetic force generation but each stator phase-winding has a connection to an intermediate point of the stator phase-winding so that force producing current can be supplied to the stator phase-winding under consideration. A first converter stage is connected to terminals of the stator phase-windings and a second converter stage connected to the intermediate points of the stator phase-windings. The first converter stage is configured to supply torque generating currents to the terminals of the stator phase-windings and the second converter stage is configured to supply force generating currents to the intermediate points of the stator phase-windings. When current is supplied to the intermediate point of a stator phase-winding, there is unbalance between currents flowing in different portions of the stator phase-winding on different sides of the intermediate point and thus radial magnetic force is directed to the rotor. The bearingless permanent magnet synchronous motor described by Chiba et al. requires only one additional three-phase converter and thus the system can be cost effective.

A bearingless electric machine of the kind mentioned above is however not free from challenges. For example, when using a stator winding structure of the kind described above, there may be situations in which the rotational position of the rotor with respect to the stator winding structure and/or the rotational speed of the rotor is/are such that it may be challenging to generate suitable radial force acting on the rotor. These situations may occur especially in cases where the rotor has significant saliency and/or structures which conduct currents. In particular, the middle-point-current-injection method is recommended for small forces and small levitation current components in relation to torque generating current components. The produced flux unbalance is not symmetrical in the stator for higher levitation current components resulting in force and torque variations and in levitation force limitation. The levitation current components are present only in half of the windings resulting in limited amplitude of the levitation forces.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new control device for controlling an electric drive that comprises:
  an electric machine comprising a rotor and a stator, the stator comprising a cage winding comprising bars and a conductor ring electrically connecting the bars to each other, and
  a converter comprising terminals connected to first ends of the bars of the cage winding, the converter being configured to supply currents to the bars of the cage winding.

A control device according to the invention comprises a computing system configured to control the converter to:
  supply torque generating current components to the bars of the cage winding so that torque is generated in accordance with electric machine control, and
  supply levitation current components to the bars of the cage winding on the basis of a deviation of the position of the rotor from a reference position so as to control magnetic force directed to the rotor.

The cage winding of the stator allows the currents of the bars to be controlled so that different spatial current sheet distributions can be generated in order to generate a desired torque and in order to direct a desired magnetic force to the rotor. For example, a magnetic field component acting only on a limited area of the airgap of the electric machine can be generated so that currents flowing in the opposing directions are supplied to adjacent bars of the cage winding. For example when using an ordinary three-phase winding, it is not possible to freely select two coil sides located in different stator slots so that currents flowing in the opposing directions are supplied to these coil sides.

The above-mentioned electric machine control may comprise for example a speed controller for providing a torque reference or an interface for receiving the torque reference from an external system. The electric machine control may further comprise, for example but not necessarily, a rotational speed sensor or estimator, a rotational position sensor or estimator, voltage sensors or estimators, current sensors or estimators, and/or magnetic flux sensors or estimators. The computing system of the controller can be configured to determine the above-mentioned torque generating current components on the basis of e.g. the two-axis model of the electric machine and the above-mentioned torque reference.

The above-mentioned position of the rotor can be determined with a suitable known position detection arrangement. The position detection arrangement may comprise for example a position sensor or a position estimator for measuring or estimating the position of the rotor in mutually perpendicular radial directions. The position estimator can be based on for example a rotational position sensor or estimator and on current, voltage, and/or magnetic flux sensors or estimators. Each current and/or magnetic flux sensor can be located in the main electric and/or magnetic circuits or elsewhere than in the main electric and/or magnetic circuits. The current and/or magnetic flux sensors located elsewhere than in the main electric and/or magnetic circuits may comprise for example search coils and/or stray flux sensors. Furthermore, measured temperature can be used in the estimation of the position of the rotor. An exemplifying position detection arrangement is described in the publication Nian, H., Quan, Y., & Li, J. (2009): *Rotor displacement sensorless control strategy for PM type bearingless motor based on the parameter identification*, 2009 International Conference on Electric Machines and Systems, 1-5. doi:10.1109/ICEMS.2009.5382650. Exemplifying ways to determine the above-mentioned levitation current components based on the measured or estimated position of the rotor are presented in the description of the exemplifying and non-limiting embodiments of the invention.

In accordance with the invention, there is provided also a new method for controlling an electric drive of the kind described above. A method according to the invention comprises:

controlling a converter to supply torque generating current components to the above-mentioned bars of the cage winding so that torque is generated in accordance with electric machine control, and controlling a converter to supply levitation current components to the bars of the cage winding on the basis of a deviation of the position of the rotor from a reference position so as to control magnetic force directed to the rotor.

In accordance with the invention, there is provided also a new electric drive that comprises:

an electric machine comprising a rotor and a stator, the stator comprising a cage winding comprising bars and a conductor ring electrically connecting the bars to each other, a converter comprising terminals connected to first ends of the bars of the cage winding, the converter being configured to supply currents to the bars of the cage winding, and a control device according to the invention for controlling the converter.

In accordance with the invention, there is provided also a new computer program for controlling an electric drive of the kind described above. A computer program according to the invention comprises computer executable instructions for controlling a programmable processing system of the electric drive to control a converter of the electric drive to:

supply torque generating current components to the above-mentioned bars of the cage winding so that torque is generated in accordance with electric machine control, and supply levitation current components to the bars of the cage winding on the basis of a deviation of the position of the rotor from a reference position so as to control magnetic force directed to the rotor.

In accordance with the invention, there is provided also a new computer program product. The computer program product comprises a non-volatile computer readable medium, e.g. an optical disc, encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Furthermore, it is to be understood that lists and groups of examples provided in the description given below are not exhaustive unless otherwise explicitly stated.

Figure 1A:
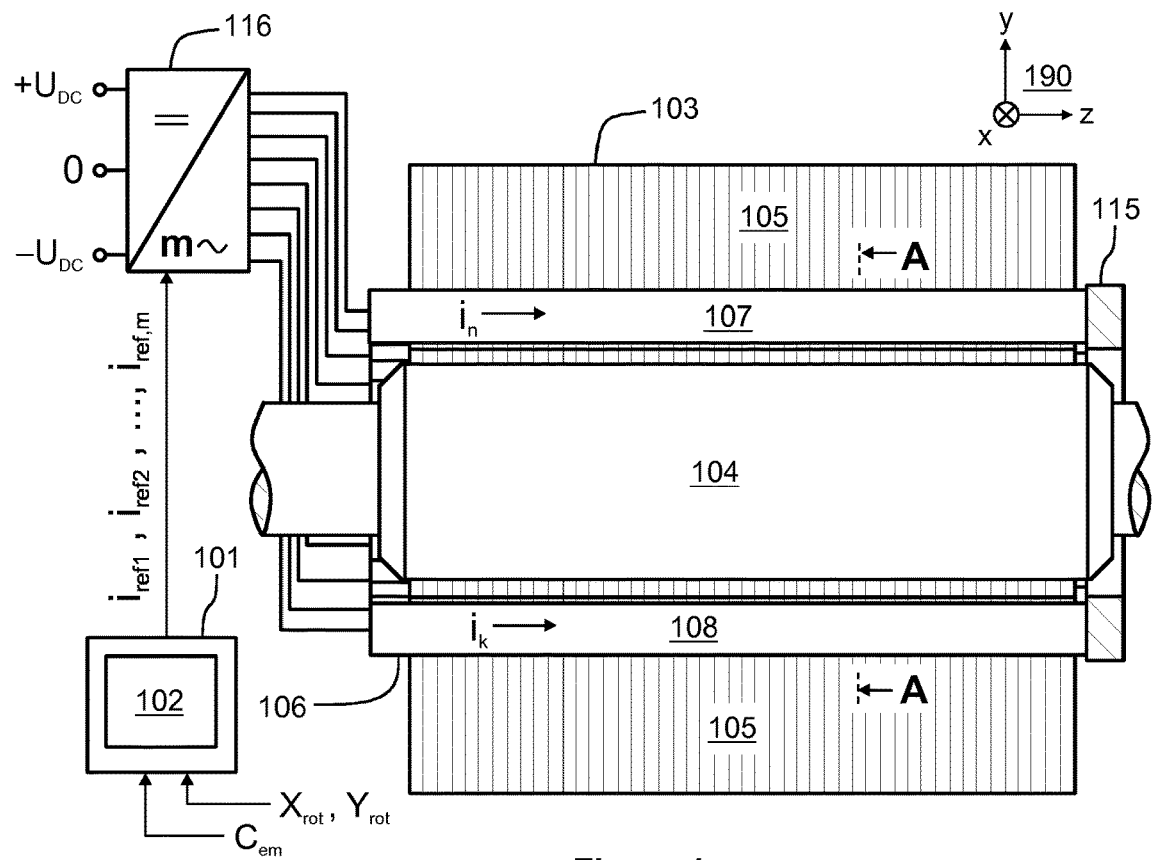
FIG. 1a illustrates an electric drive comprising a control device according to an exemplifying and non-limiting embodiment of the invention.
Figure 1B:
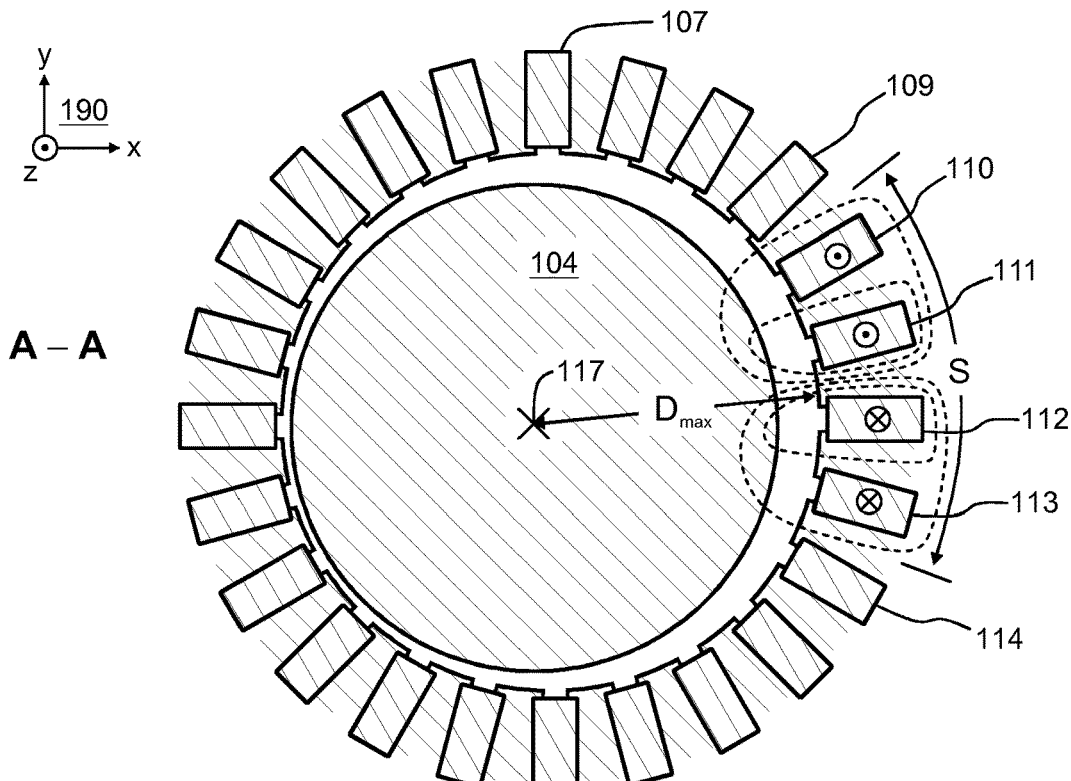
FIGS. 1b, 1c, and 1d illustrate exemplifying ways to control magnetic forces in the electric drive illustrated in FIG. 1a, FIG. 2 illustrates an electric drive according to an exemplifying and non-limiting embodiment of the invention.
Figure 1C:
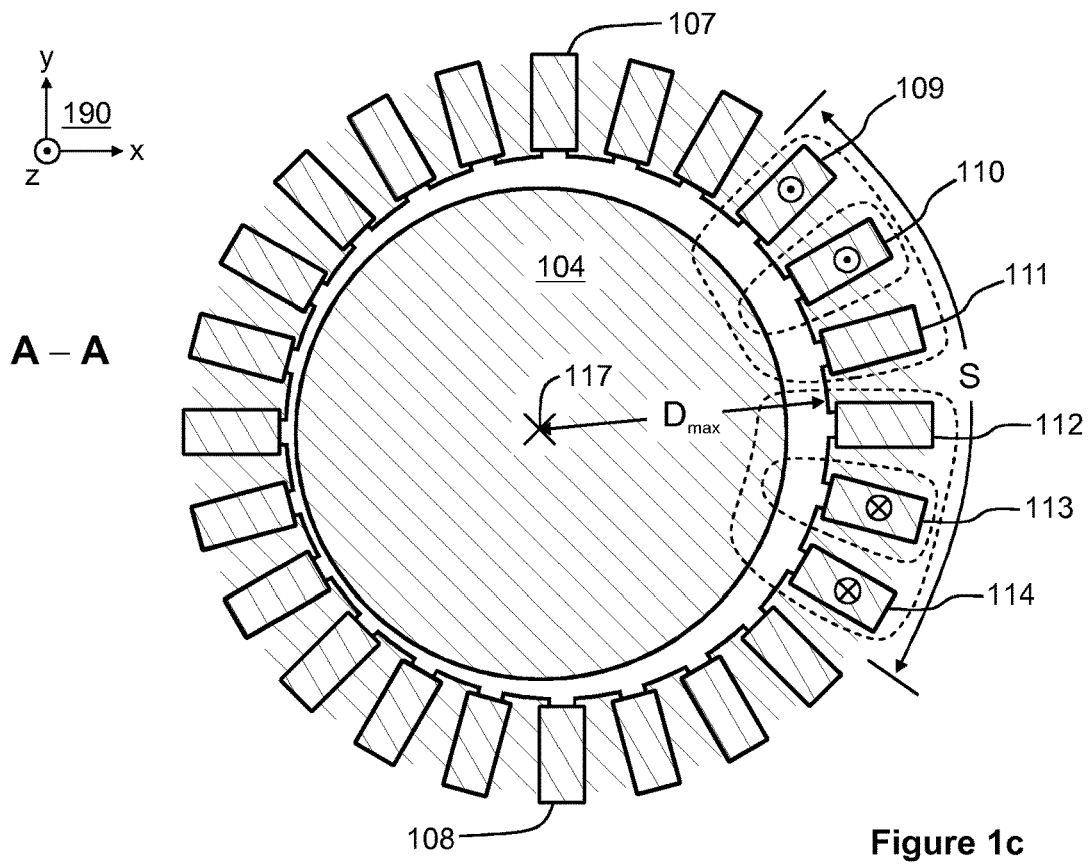
Figure 1D:
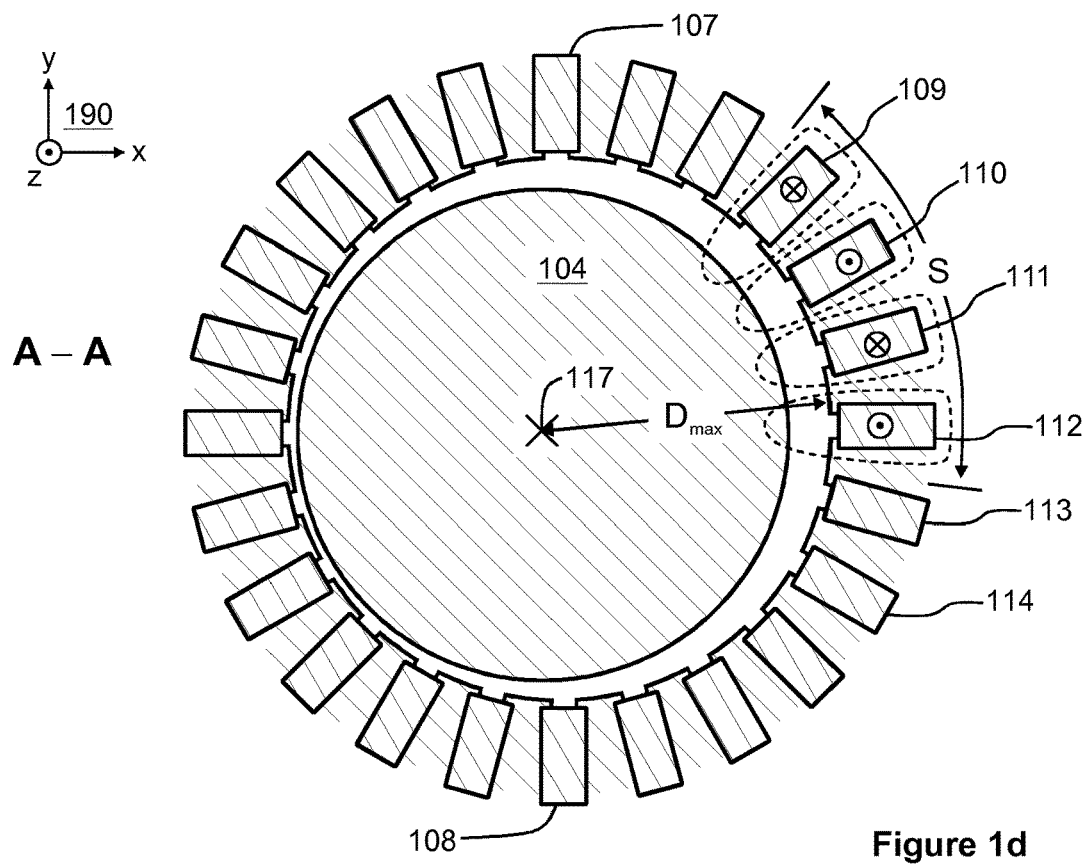

FIG. 1a shows a schematic illustration of an electric drive comprising a control device 101 according to an exemplifying and non-limiting embodiment of the invention. The electric drive comprises an electric machine 103 that comprises a rotor 104 and a stator 105. The electric machine 103 may operate as a motor or as a generator. The electric machine 103 can be a permanent magnet machine whose rotor comprises permanent magnet material, an induction machine, or a reluctance machine where the direct "d" axis inductance differs from the quadrature "q" axis inductance. In case of an induction machine, the rotor can be e.g. a laminated core rotor with a cage winding, or a solid rotor with or without a cage winding, or a split rotor with or without a cage winding. Furthermore, in case of an induction machine, a pole changing method of the speed control, where the rotor develops different number of poles, can be applied. The stator 105 of the electric machine 103 comprises a ferromagnetic core structure and a cage winding 106 that acts as a stator winding. In FIG. 1a, the stator 105 is presented as a section view where the section plane is parallel with the yz-plane of a coordinate system 190. FIGS. 1b, 1c, and 1d show a view of a section taken along a line A-A shown in FIG. 1a. The section plane related to FIGS. 1b-1c is parallel with the xy-plane of the coordinate system 190. The cage winding 106 of the stator 105 comprises bars and a conductor ring 115 that electrically connects the bars to each other. In FIG. 1a, two of the bars of the cage winding 106 are denoted with references 107 and 108. In FIGS. 1b-1d, eight of the bars are denoted with references 107, 108, 109, 110, 111, 112, 113, and 114. Each bar of the cage winding 106 can be a solid rod of e.g. aluminum, copper, or other suitable electrically conductive material. It is also possible that each bar of the cage winding 106 comprises many parallel connected bar elements in order to mitigate resistance increase caused by the skin effect. It is worth noting that FIGS. 1a-1d show schematic illustrations only, and thus the shapes and the dimension ratios of the teeth, the bars, the conductor ring, the yoke-sections, and other parts of the stator 105 are not necessarily optimal from the viewpoint of the operation of the electric machine 103. The rotor 104 is presented schematically so that the mechanical structure of the rotor 104 is not shown. In FIGS. 1b-1d, the cross-sectional shape of the rotor 104 is presented as a circle but it is also possible that the rotor has a non-circular cross-sectional shape.

The stator 105 comprising the bars and the conductor ring 115, can be integrated with a machine cooling system by accommodating cooling channels inside or outside or around of the bars and the ring. Various coolants can be used, such as for example air, oil, water, alcohol, and others. The cage winding can be manufactured by casting or by 3D printing or by additive diffusion so as to integrate the winding structure and the cooling structure.

The electric drive comprises a converter 116 connected to first ends of the bars of the cage winding 106. The converter 116 is configured to supply currents to the bars of the cage winding 106 in accordance with reference values $i_{ref1}$, $i_{ref2}$, ..., $i_{ref,m}$, where m is the number of the bars of the cage winding 106. The reference values $i_{ref1}$, $i_{ref2}$, ..., $i_{ref,m}$ are determined by the control device 101. In FIG. 1a, the current of the bar 107 is denoted with $i_n$ and the current of the bar 108 is denoted with $i_k$, where n and k are mutually unequal integers each being at least 1 and at most m. In the exemplifying case illustrated in FIG. 1a, the converter 116 is an m-phase three-level converter that is configured to couple the end of each bar of the cage winding 106 alternately to voltages $+U_{DC}$, 0, and $-U_{DC}$ so that the currents of the bars correspond to the reference values $i_{ref1}$, $i_{ref2}$, ..., $i_{ref,m}$ with a sufficient accuracy. The converter 116 can be configured to apply e.g. hysteresis control for controlling the output currents of the converter 116 to correspond to the reference values $i_{ref1}$, $i_{ref2}$, ..., $i_{ref,m}$ with a sufficient accuracy. Instead of the m-phase three-level converter 116, it is also possible to use an m-phase two-level converter, or an m-phase converter having more than three output voltage levels. Furthermore, it is also possible to use an m-phase converter configured to produce continuously adjustable output voltages. In FIGS. 1a-1d, the current of each bar is deemed to be positive when the direction of the current is the positive z-direction of the coordinate system 190. Correspondingly, the current of each bar is deemed to be negative when the direction of the current is the negative z-direction of the coordinate system 190. In this document the verb "supply" is used also when negative current is supplied to a bar i.e. the current is actually received from the bar.

The control device 101 comprises a computing system 102 that is configured to determine torque generating current components $i_{T1}$, $i_{T2}$, ..., $i_{Tm}$ to be supplied to the bars of the cage winding 106 so that torque is generated in accordance with electric machine control. The computing system 102 is configured to determine levitation current components $i_{S1}$, $i_{S2}$, ..., $i_{Sm}$ to be supplied to the bars of the cage winding 106 so as to control the magnetic force directed to the rotor in accordance with levitation control. The levitation current components $i_{S1}$, $i_{S2}$, ..., $i_{Sm}$ are determined at least partly on the basis of a deviation of the position of the rotor 104 from a reference position of the rotor. The position of the rotor 104 can be defined for example with actual x- and y-coordinates $X_{rot}$, $Y_{rot}$ of the rotational axis of the rotor 104, and the reference position can be defined with reference x- and y-coordinates $X_{ref}$, $Y_{ref}$ of the rotational axis. In this exemplifying case, the deviation is expressed by the differences $X_{ref}-X_{rot}$ and $Y_{ref}-Y_{rot}$. In FIGS. 1b-1d, the rotational axis of the rotor 104 is denoted with a reference 117. The computing system 102 is configured to determine the reference values $i_{ref1}$, $i_{ref2}$, ..., $i_{ref,m}$ of the currents of the cage winding 106 on the basis of the determined torque generating current components $i_{T1}$, $i_{T2}$, ..., $i_{Tm}$ and the determined levitation current components $i_{S1}$, $i_{S2}$, ..., $i_{Sm}$. The reference values can be for example $i_{ref1}=i_{T1}+i_{S1}$, $i_{ref2}=i_{T2}+i_{S2}$, ..., $i_{ref,m}=i_{Tm}+i_{Sm}$.

The above-mentioned electric machine control may comprise for example a rotational speed and/or position sensor or estimator, and a speed controller that provides a torque reference. The rotational speed and/or position sensor or estimator is not shown in FIGS. 1a-1d. In FIG. 1a, a quantity $C_{em}$ represents a control quantity related to the electric machine control. The quantity $C_{em}$ can be e.g. measured or estimated rotational speed and/or position on the basis of which the computing system 102 forms the torque reference. The rotational speed and/or position can be estimated on the basis of magnetic fluxes, voltages, and/or currents. Furthermore, measured temperature can be used in the estimation. It is also possible that the electric machine 103 is driven with an externally given torque reference in which case the quantity $C_{em}$ can be the torque reference. The computing system 102 can be configured to determine the torque generating current components $i_{T1}$, $i_{T2}$, ..., $i_{Tm}$ on the basis of the torque reference, the prevailing and/or desired magnetic fluxes of the electric machine 103, and the rotational position and/or speed of the rotor 104. The electric machine control can be based on e.g. the two-axis model of the electric machine 103.

The above-mentioned levitation control may comprise for example a position sensor or estimator for measuring or estimating the actual x- and y-coordinates $X_{rot}$, $Y_{rot}$ of the rotational axis 117. The position sensor or estimator is not shown in FIGS. 1a-1d. The actual x- and y-coordinates $X_{rot}$, $Y_{rot}$ of the rotational axis 117 can be estimated on the basis of magnetic fluxes, the rotational position and/or speed, voltages, and/or currents. Furthermore, the measured temperature can be used in the estimation. The computing system 102 is configured to determine the levitation current components $i_{S1}$, $i_{S2}$, ..., $i_{Sm}$ on the basis of the actual x- and y-coordinates $X_{rot}$, $Y_{rot}$ of the rotational axis 117 and the reference position of the rotational axis 117. Exemplifying ways to determine the levitation current components $i_{S1}$, $i_{S2}$, ..., $i_{Sm}$ are illustrated below with reference to FIGS. 1b-1d.

In a control device according to an exemplifying and non-limiting embodiment of the invention, the computing system 102 is configured to determine a sector of the stator 105 so that the determined sector comprises a maximum distance point that is a point on the circumference of the airgap surface of the stator where the distance to the rotational axis 117 of the rotor is greatest. In FIGS. 1b-1d, the determined sector is denoted with S and the greatest distance between the airgap surface of the stator and the rotational axis 117 is denoted with $D_{max}$. The computing system 102 can be configured to determine the levitation current components $i_{S1}, i_{S2}, \ldots, i_{Sm}$ for example so that the levitation current components are non-zero in two or more bars which belong to the determined sector S and the levitation current components are zero in the other bars of the cage winding 106. The width of the determined sector S can be for example 2, 3, 4, 5, 6, or 7 stator slot pitches.

FIG. 1b illustrates an exemplifying case where the sector S is determined symmetrically so that the maximum distance point is substantially on the middle of the sector S and where non-zero levitation current component is determined for every bar which belongs to the determined sector S. In this exemplifying case, positive levitation current components are determined for bars 110 and 111 which are on a first side of the maximum distance point and negative levitation current components are determined for bars 112 and 113 which are on the second side of the maximum distance point. In FIG. 1b, the magnetic field generated by the above-mentioned levitation current components is illustrated with exemplifying flux lines presented as dashed lines. As can be understood on the basis of FIG. 1b, the above-mentioned levitation current components produce a magnetic force component which tends to move the rotor 104 so that the distance $D_{max}$ decreases.

FIG. 1c illustrates an exemplifying case where the sector S is determined symmetrically and non-zero levitation current components are determined for bars which belong to the determined sector S and which are located on both sides of one or more bars which are closest to the maximum distance point. In this exemplifying case, positive levitation current components are determined for bars 109 and 110 and negative levitation current components are determined for bars 113 and 114. In FIG. 1c, the magnetic field generated by the above-mentioned levitation current components is illustrated with exemplifying flux lines presented as dashed lines. As can be understood on the basis of FIG. 1c, the above-mentioned levitation current components produce a magnetic force component which tends to move the rotor 104 so that the distance $D_{max}$ decreases.

FIG. 1d illustrates an exemplifying case where the sector S is determined asymmetrically so that the maximum distance point is not on the middle of the sector S and where a positive levitation current component is determined for every second of the bars belonging to the sector S and negative levitation current components are determined for the rest of the bars belonging to the sector S. In this exemplifying case, positive levitation current components are determined for bars 110 and 112 and negative levitation current components are determined for bars 109 and 111. In FIG. 1d, the magnetic field generated by the above-mentioned levitation current components is illustrated with exemplifying flux lines presented as dashed lines. As can be understood on the basis of FIG. 1d, the above-mentioned levitation current components produce a magnetic force component which tends to move the rotor 104 so that the distance $D_{max}$ decreases.

It is to be noted that only the levitation current components $i_{S1}, i_{S2}, \ldots, i_{Sm}$ are illustrated in FIGS. 1b-1d. The torque generating current components $i_{T1}, i_{T2}, \ldots, i_{Tm}$ for torque production are not illustrated in FIGS. 1b-1d. An advantageous way to determine the levitation current components $i_{S1}, i_{S2}, \ldots, i_{Sm}$ may depend on several factors such as for example: the type of the electric machine 103, the structure of the rotor 104, the rotational position of the rotor with respect to the maximum distance point, the rotational speed of the rotor, the prevailing torque, and the prevailing magnetic fluxes of the electric machine. The type of the electric machine can be for example a permanent magnet machine, an induction machine, or a reluctance machine. The torque production and the magnetic levitation are not independent of each other because of nonlinear relationship between currents and magnetic forces. The torque production and the magnetic levitation can be dependent on both the angular position of the rotor and the number of poles. The effect of the torque production on the magnetic levitation and, correspondingly, the effect of the magnetic levitation on the torque production can be corrected with the aid of feedback controls configured to drive the torque towards the reference torque and the position of the rotational axis 117 towards the reference position.

Figure 2:
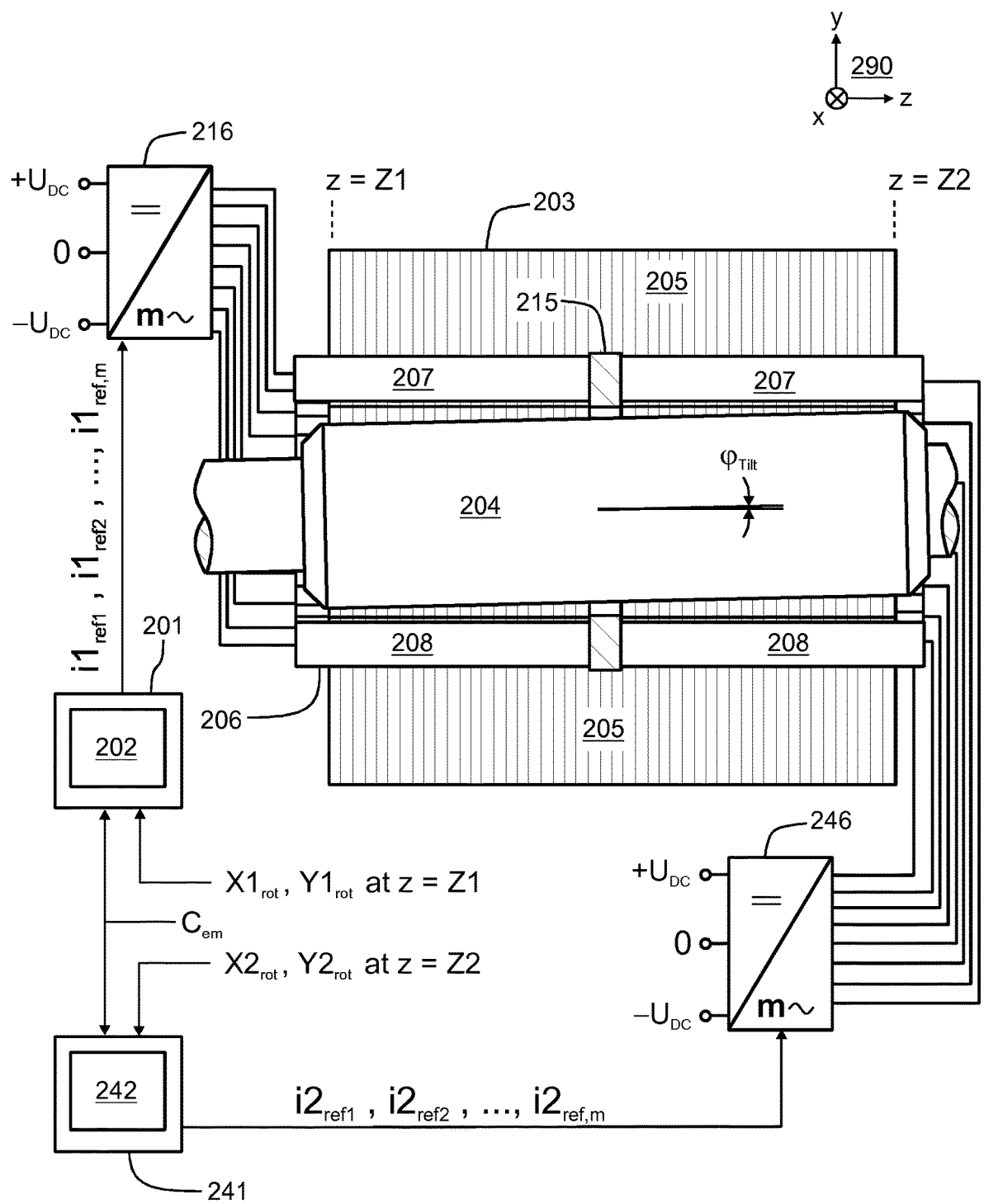

FIG. 2 shows a schematic illustration of an electric drive according to an exemplifying and non-limiting embodiment of the invention. The electric drive comprises an electric machine 203 that comprises a rotor 204 and a stator 205. The electric machine 203 can be a permanent magnet machine, an induction machine, or a reluctance machine. The stator 205 of the electric machine 203 comprises a ferromagnetic core structure and a cage winding 206 that acts as a stator winding. In FIG. 2, the stator 205 is presented as a section view where the section plane is parallel with the yz-plane of a coordinate system 290. The cage winding 206 of the stator 205 comprises bars and a conductor ring 215 that electrically connects the bars to each other. In FIG. 2, two of the bars of the cage winding 206 are denoted with references 207 and 208. In this exemplifying case, the conductor ring 215 of the cage winding 206 is between first ends of the bars and the second ends of the bars in the axial direction of the electric machine.

The electric drive comprises a first converter 216 that comprises first terminals connected to the first ends of the bars of the cage winding 206. The first converter 216 is configured to supply first currents to the bars of the cage winding in accordance with reference values $i1_{ref1}, i1_{ref2}, \ldots, i1_{ref,m}$ of the first currents. The electric drive comprises a first control device 201 that comprises a first computing system 202 configured to determine first torque generating current components $i1_{T1}, i1_{T2}, \ldots, i1_{Tm}$ to be supplied to the first ends of the bars of the cage winding so that first torque is generated in accordance with electric machine control. The computing system 202 is configured to determine first levitation current components $i1_{S1}, i1_{S2}, \ldots, i1_{Sm}$ to be supplied to the first ends the bars of the cage winding 206. The first levitation current components $i1_{S1}, i1_{S2}, \ldots, i1_{Sm}$ are determined on the basis of a deviation of a first position of the rotor 204 from the reference position. The first position of the rotor 204 can be expressed for example with the aid of x- and y-coordinates $X1_{rot}$ and $Y1_{rot}$ of the intersection between the geometric symmetry axis of the rotor 204 and a geometric plane where z=Z1 and which is parallel with the xy-plane of the coordinate system 290. The computing system 202 is configured to determine the reference values $i1_{ref1}, i1_{ref2}, \ldots, i1_{ref,m}$ based on the determined first torque generating current components $i1_{T1}, i1_{T2}, \ldots, i1_{Tm}$ and the determined first levitation current components $i1_{S1}, i1_{S2}, \ldots, i1_{Sm}$. The reference values can be for example $i1_{ref1}=i1_{T1}+i1_{S1}, i1_{ref2}=i1_{T2}+i1_{S2}, \ldots, i1_{ref,m}=i1_{Tm}+i1_{Sm}$.

The electric drive comprises a second converter 246 that comprises second terminals connected to the second ends of the bars of the cage winding 206. The second converter 246 is configured to supply second currents to the bars of the cage winding in accordance with reference values $i2_{ref1}$, $i2_{ref2}$, ..., $i2_{ref,m}$ of the second currents. The electric drive comprises a second control device 241 that comprises a second computing system 242 configured to determine second torque generating current components $i2_{T1}$, $i2_{T2}$, ..., $i2_{Tm}$ to be supplied to the second ends of the bars of the cage winding 206 so that second torque is generated in accordance with electric machine control. The computing system 242 is configured to determine second levitation current components $i2_{S1}$, $i2_{S2}$, ..., $i2_{Sm}$ to be supplied to the second ends the bars of the cage winding 206: The second levitation current components $i2_{S1}$, $i2_{S2}$, ..., $i2_{Sm}$ are determined on the basis of a deviation of a second position of the rotor 204 from the reference position. The second position of the rotor 204 can be expressed for example with the aid of x- and y-coordinates $X2_{rot}$ and $Y2_{rot}$ of the intersection between the geometric symmetry axis of the rotor 204 and a geometric plane where z=Z2 and which is parallel with the xy-plane of the coordinate system 290. The computing system 242 is configured to determine the reference values $i2_{ref1}$, $i2_{ref2}$, ..., $i2_{ref,m}$ based on the determined second torque generating current components $i2_{T1}$, $i2_{T2}$, ..., $i2_{Tm}$ and the determined second levitation current components $i2_{S1}$, $i2_{S2}$, ..., $i2_{Sm}$. The reference values can be for example $i2_{ref1}=i2_{T1}+i2_{S1}$, $i2_{ref2}=i2_{T2}+i2_{S2}$, ..., $i2_{ref,m}=i2_{Tm}+i2_{Sm}$.

As the levitation control tends to drive the above-mentioned first position of the rotor 204 to the reference position and also the above-mentioned second position of the rotor to the reference position, the levitation control tends to drive the tilting angle $\varphi_{Tilt}$ to zero. The tilting angle $\varphi_{Tilt}$ can be defined as an angle between the geometric symmetry axis of the rotor 204 and the z-axis of the coordinate system 290.

It is also possible that control variables of the rotor position control are x- and y-directional displacements of the rotor mass center and tilting angles $\varphi_{Tilt,x}$ and $\varphi_{Tilt,y}$ of the rotor with respect to the x- and y-axes of a coordinate system whose origin is in the reference position of the rotor mass center and whose z-axis coincides with the reference position of the geometric rotational axis of the rotor. Generally different coupled and decoupled control strategies with differently defined control variables are possible.

Figure 3:
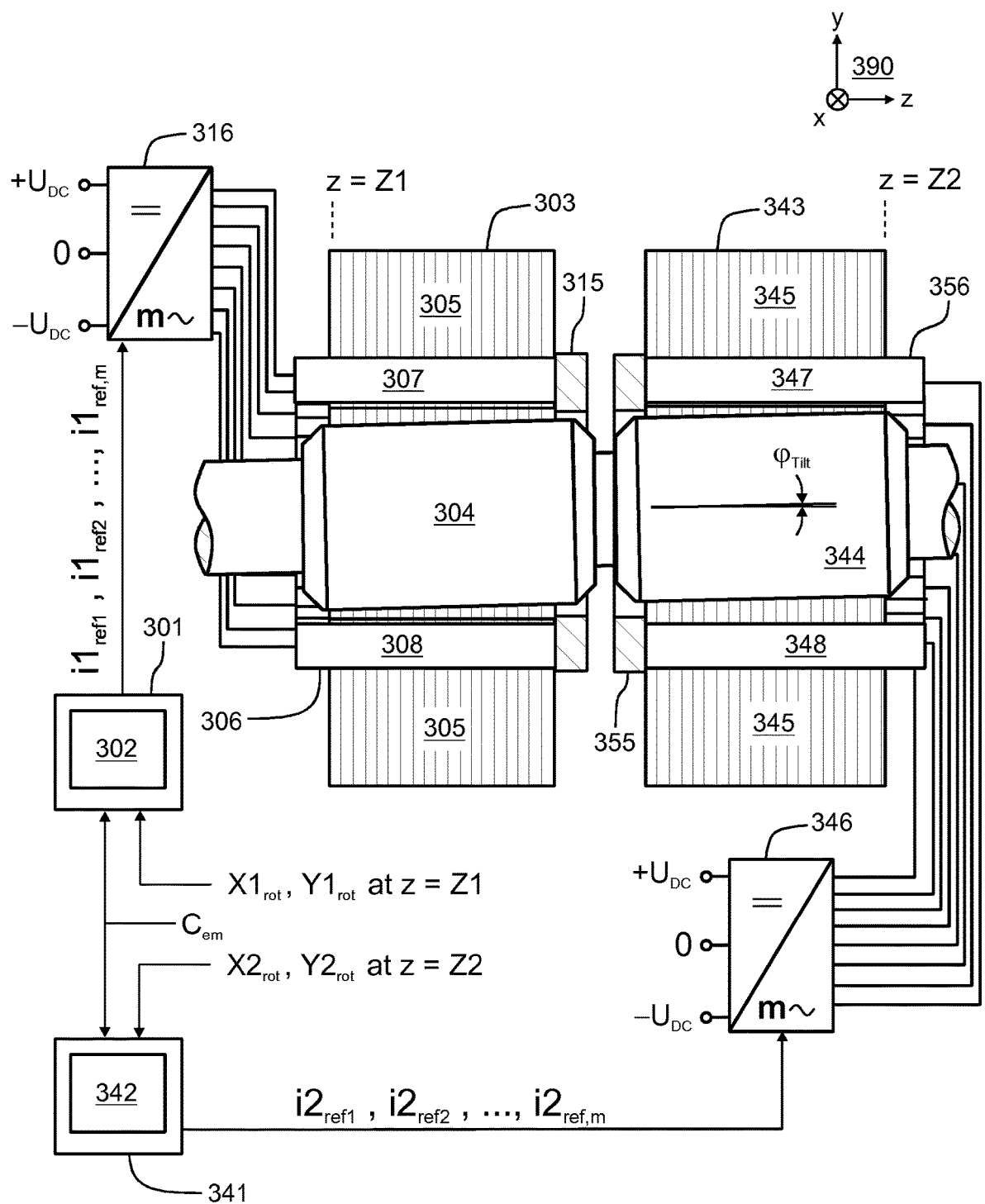
FIG. 3 illustrates an electric drive according to an exemplifying and non-limiting embodiment of the invention.

FIG. 3 shows a schematic illustration of an electric drive according to an exemplifying and non-limiting embodiment of the invention. The electric drive comprises a first electric machine 303 that comprises a first rotor 304 and a first stator 305. The stator 305 of the electric machine 303 comprises a ferromagnetic core structure and a first cage winding 306 that acts as a stator winding. The electric drive comprises a second electric machine 343 that comprises a second rotor 344 and a second stator 345. The stator 345 of the electric machine 343 comprises a ferromagnetic core structure and a second cage winding 356 that acts as a stator winding. In FIG. 3, the stators 305 and 345 are presented as section views where the section plane is parallel with the yz-plane of a coordinate system 390. The cage winding 306 of the stator 305 comprises bars and a conductor ring 315 that electrically connects the bars to each other. In FIG. 3, two of the bars of the cage winding 306 are denoted with references 307 and 308. The cage winding 356 of the stator 345 comprises bars and a conductor ring 355 that electrically connects the bars to each other. In FIG. 3, two of the bars of the cage winding 356 are denoted with references 347 and 348.

The electric drive comprises a first converter 316 that comprises first terminals connected to ends of the bars of the cage winding 306. The first converter 316 is configured to supply first currents to the bars of the cage winding in accordance with reference values $i1_{ref1}$, $i1_{ref2}$, ..., $i1_{ref,m}$ of the first currents. The electric drive comprises a first control device 301 that comprises a first computing system 302 configured to determine first torque generating current components $i1_{T1}$, $i1_{T2}$, ..., $i1_{Tm}$ to be supplied to the bars of the cage winding 306 so that first torque is generated in accordance with electric machine control. The computing system 302 is configured to determine first levitation current components $i1_{S1}$, $i1_{S2}$, ..., $i1_{Sm}$ to be supplied to the bars of the cage winding 306. The first levitation current components $i1_{S1}$, $i1_{S2}$, ..., $i1_{Sm}$ are determined on the basis of a deviation of the position of the rotor 304 from the reference position. The position of the rotor 304 can be expressed for example with the aid of x- and y-coordinates $X1_{rot}$ and $Y1_{rot}$ of the intersection between the geometric symmetry axis of the rotors 304 and 344 and a geometric plane where z=Z1 and which is parallel to the xy-plane of the coordinate system 390. The computing system 302 is configured to determine the reference values $i1_{ref1}$, $i1_{ref2}$, ..., $i1_{ref,m}$ based on the determined first torque generating current components $i1_{T1}$, $i1_{T2}$, ..., $i1_{Tm}$ and the determined first levitation current components $i1_{S1}$, $i1_{S2}$, ..., $i1_{Sm}$. The reference values can be for example $i1_{ref1}=i1_{T1}+i1_{S1}$, $i1_{ref2}=i1_{T2}+i1_{S2}$, ..., $i1_{ref,m}=i1_{Tm}+i1_{Sm}$.

The electric drive comprises a second converter 346 that comprises second terminals connected to ends of the bars of the cage winding 356. The second converter 346 is configured to supply second currents to the bars of the cage winding 356 in accordance with reference values $i2_{ref1}$, $i2_{ref2}$, ..., $i2_{ref,m}$ of the second currents. The electric drive comprises a second control device 341 that comprises a second computing system 342 configured to determine second torque generating current components $i2_{T1}$, $i2_{T2}$, ..., $i2_{Tm}$ to be supplied to the bars of the cage winding 356 so that second torque is generated in accordance with the electric machine control. The computing system 342 is configured to determine second levitation current components $i2_{S1}$, $i2_{S2}$, ..., $i2_{Sm}$ to be supplied to the bars of the cage winding 356. The second levitation current components $i2_{S1}$, $i2_{S2}$, ..., $i2_{Sm}$ are determined on the basis of a deviation of the position of the rotor 344 from the reference position. The position of the rotor 344 can be expressed for example with the aid of x- and y-coordinates $X2_{rot}$ and $Y2_{rot}$ of the intersection between the geometric symmetry axis of the rotors 304 and 344 and a geometric plane where z=Z2 and which is parallel to the xy-plane of the coordinate system 390. The computing system 342 is configured to determine the reference values $i2_{ref1}$, $i2_{ref2}$, ..., $i2_{ref,m}$ based on the determined second torque generating current components $i2_{T1}$, $i2_{T2}$, ..., $i2_{Tm}$ and the determined second levitation current components $i2_{S1}$, $i2_{S2}$, ..., $i2_{Sm}$. The reference values can be for example $i2_{ref1}=i2_{T1}+i2_{S1}$, $i2_{ref2}=i2_{T2}+i2_{S2}$, ..., $i2_{ref,m}=i2_{Tm}+i2_{Sm}$.

As the levitation control tends to drive the above-mentioned position of the rotor 304 to the reference position and also the above-mentioned position of the rotor 344 to the reference position, the levitation control tends to drive the tilting angle $\varphi_{Tilt}$ to zero. The tilting angle $\varphi_{Tilt}$ can be defined as an angle between the z-axis of the coordinate system 390 and the geometric symmetry axis of the rotors 304 and 344.

The control device 101 shown in FIG. 1a can be implemented with one or more analogue circuits and/or with one or more digital processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the control device 101 may comprise one or more memory circuits each of which can be e.g. a random access memory "RAM" circuit. Correspondingly, the control devices 201 and 241 shown in FIG. 2 can be implemented with one or more analogue circuits and/or with one or more digital processor circuits and the control devices 201 and 241 may comprise one or more memory circuits. Correspondingly, the control devices 301 and 341 shown in FIG. 3 can be implemented with one or more analogue circuits and/or with one or more digital processor circuits and the control devices 301 and 341 may comprise one or more memory circuits. The control devices 201 and 241 shown in FIG. 2 can be implemented with same hardware. In FIG. 2, the control devices 201 and 241 are depicted as separate entities for the sake of illustrative purposes.

Correspondingly, the control devices 301 and 341 shown in FIG. 3 can be implemented with same hardware. In FIG. 3, the control devices 301 and 341 are depicted as separate entities for the sake of illustrative purposes.

Figure 4:
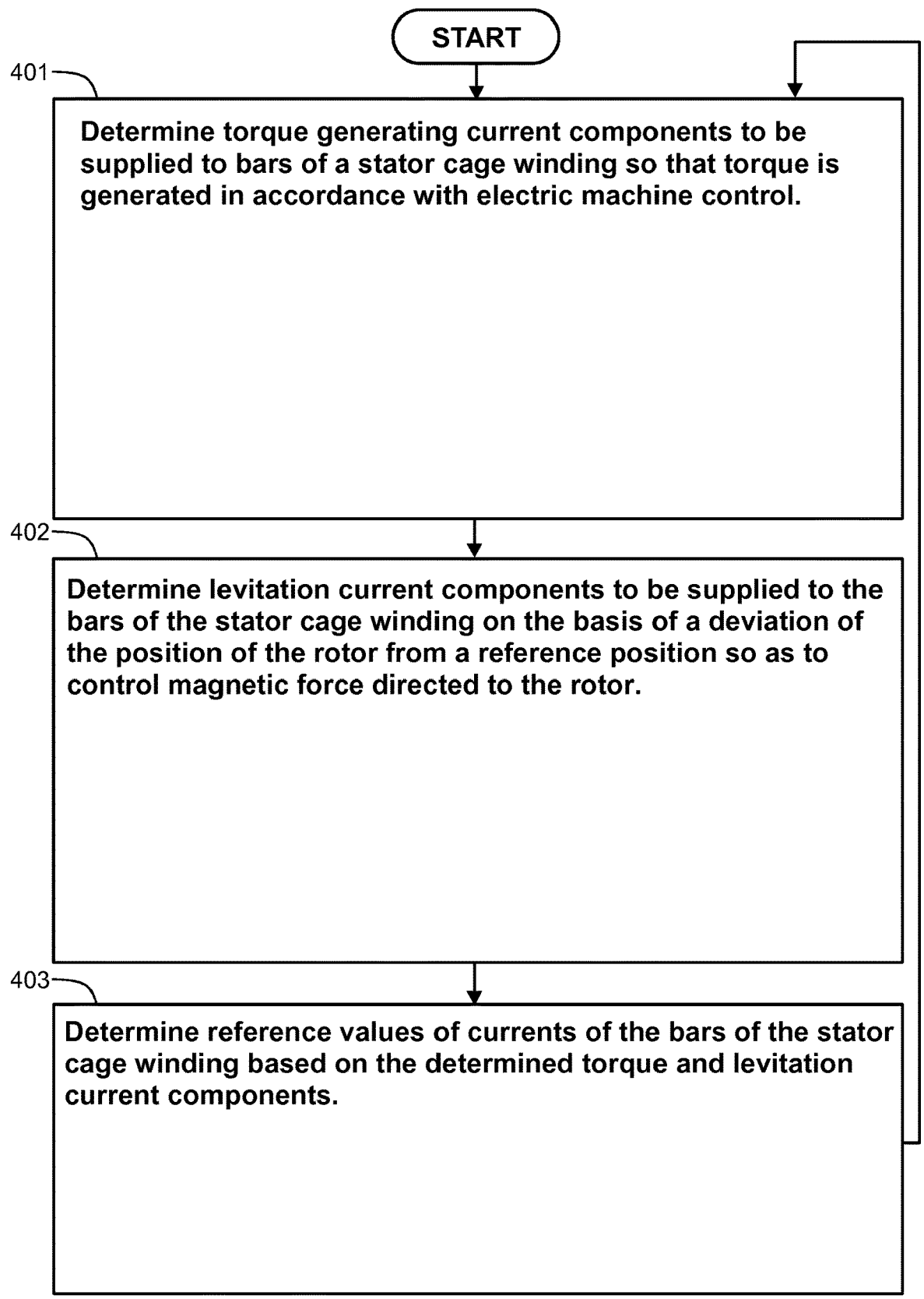
FIG. 4 shows a flowchart of a method according to an exemplifying and non-limiting embodiment of the invention for controlling an electric drive.

FIG. 4 shows a flowchart of a method according to an exemplifying and non-limiting embodiment of the invention for controlling an electric drive that comprises:
- an electric machine comprising a rotor and a stator, the stator comprising a cage winding comprising bars and a conductor ring electrically connecting the bars to each other, and
- a converter comprising terminals connected to first ends of the bars of the cage winding, the converter being configured to supply currents to the bars of the cage winding in accordance with reference values of the currents.

The method comprises the following actions:
- action 401: determining torque generating current components to be supplied to the bars of the cage winding so that torque is generated in accordance with electric machine control,
- action 402: determining levitation current components to be supplied to the bars of the cage winding on the basis of a deviation of the position of the rotor from a reference position so as to control magnetic force directed to the rotor, and
- action 403: determining the reference values of the currents based on the determined torque and levitation current components.

A method according to an exemplifying and non-limiting embodiment of the invention comprises:
- determining a sector of the stator so that the determined sector comprises a maximum distance point that is a point on the circumference of the airgap surface of the stator where a distance to the rotational axis of the rotor is greatest, and
- determining the levitation current components to be supplied to at least two of the bars of the cage winding which belong to the determined sector of the stator.

In a method according to an exemplifying and non-limiting embodiment of the invention, the sector of the stator is determined symmetrically so that the maximum distance point is substantially on the middle of the determined sector.

In a method according to an exemplifying and non-limiting embodiment of the invention, the maximum distance point is determined based on signals indicative of the position of the rotor.

In a method according to an exemplifying and non-limiting embodiment of the invention, the levitation current components are determined so that the above-mentioned at least two bars of the cage winding comprise every bar which belongs to the determined sector of the stator.

In a method according to an exemplifying and non-limiting embodiment of the invention, the levitation current components are determined so that the above-mentioned at least two bars of the cage winding are bars which belong to the determined sector of the stator and which are located on both sides of one or more bars of the cage winding which are closest to the maximum distance point.

Alternatively, the levitation current components are applied to the opposing sectors, one being closest to the rotational axis of the displaced rotor and another being farthest from the rotational axis of the displaced. In this way, the flux unbalance is created in the airgap resulting in more linear, stronger and stable levitation force than when it is applied only from the sector on one side. The specific flux pattern and required levitation current components, or voltages, depend on particular rotor features, such as location and shape of permanent magnets, conductor and flux barriers. The levitation current components are also dependent and can be synchronized to the rotating torque producing currents depending on the rotor structure, e.g. number of poles and specific torque generation principle.

In a method according to an exemplifying and non-limiting embodiment of the invention, the levitation current components are determined so that the levitation current component of each of the above-mentioned at least two bars which is on a first side of the maximum distance point is positive and the levitation current component of each of the above-mentioned at least two bars which is on a second side of the maximum distance point is negative.

In a method according to an exemplifying and non-limiting embodiment of the invention, the levitation current components are determined so that the levitation current component of every second of the above-mentioned at least two bars is positive and the levitation current components of the others of the above-mentioned at least two bars are negative.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software means for controlling a programmable processing system of an electric drive that comprises:
- an electric machine comprising a rotor and a stator, the stator comprising a cage winding comprising bars and a conductor ring electrically connecting the bars to each other, and
- a converter comprising terminals connected to first ends of the bars of the cage winding, the converter being configured to supply currents to the bars of the cage winding in accordance with reference values of the currents.

The software means comprise computer executable instructions for controlling the programmable processing system to:
- determine torque generating current components to be supplied to the bars of the cage winding so that torque is generated in accordance with electric machine control, determine levitation current components to be supplied to the bars of the cage winding on the basis of a deviation of the position of the rotor from a reference position so as to control magnetic force directed to the rotor, and determine the reference values of the currents based on the determined torque and levitation current components.

The software means can be e.g. subroutines or functions implemented with a suitable programming language and with a compiler suitable for the programming language and for the programmable processing system under consideration. It is worth noting that also a source code corresponding to a suitable programming language represents the software means because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. an optical disc, encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. In the above-described non-limiting examples, reference values of currents are formed first and then a converter is controlled to supply currents to bars of a stator cage winding so that the supplied currents correspond to the reference values with a sufficient accuracy. It is, however, also possible to use control principles different from the above-described control principle based on reference currents. For example, voltages applied on the ends of the bars of the cage winding can be controlled directly in accordance with the torque control and the measured or estimated position of the rotor.

It is to be noted that lists and groups of examples provided in the description given above are not exhaustive unless otherwise explicitly stated.

What is claimed is:

1. A control device for controlling an electric drive that comprises:

an electric machine comprising a rotor and a stator, the stator comprising a cage winding comprising bars and a conductor ring electrically connecting the bars to each other, and a converter comprising terminals connected to first ends of the bars of the cage winding, the converter being configured to supply currents to the bars of the cage winding, the control device comprising a computing system configured to control the converter to:

supply torque generating current components to the bars of the cage winding so that torque is generated in accordance with electric machine control, and supply levitation current components to the bars of the cage winding on the basis of a deviation of a position of the rotor from a reference position so as to control magnetic force directed to the rotor.

2. A control device according to claim 1, wherein the computing system is configured to:

determine a sector of the stator so that the determined sector comprises a maximum distance point that is a point on a circumference of an airgap surface of the stator where a distance to a rotational axis of the rotor is greatest, and control the converter to supply the levitation current components to at least two of the bars of the cage winding which belong to the determined sector of the stator.

3. A control device according to claim 2, wherein the computing system is configured to control the converter to supply the levitation current components so that the at least two of the bars of the cage winding comprise every bar which belongs to the determined sector of the stator.

4. A control device according to claim 3, wherein the computing system is configured to control the converter to supply the levitation current components so that the levitation current component of each of the at least two bars which is on a first side of the maximum distance point is positive and the levitation current component of each of the at least two bars which is on a second side of the maximum distance point is negative.

5. A control device according to claim 2, wherein the computing system is configured to control the converter to supply the levitation current components so that the at least two of the bars of the cage winding are bars which belong to the determined sector of the stator and which are located on both sides of one or more of the bars of the cage winding which are closest to the maximum distance point.

6. A control device according to claim 5, wherein the computing system is configured to control the converter to supply the levitation current components so that the levitation current component of each of the at least two bars which is on a first side of the maximum distance point is positive and the levitation current component of each of the at least two bars which is on a second side of the maximum distance point is negative.

7. A control device according to claim 2, wherein the computing system is configured to control the converter to supply the levitation current components so that the levitation current component of each of the at least two bars which is on a first side of the maximum distance point is positive and the levitation current component of each of the at least two bars which is on a second side of the maximum distance point is negative.

8. A control device according to claim 2, wherein the computing system is configured to control the converter to supply the levitation current components so that the levitation current component of every second of the at least two bars is positive and the levitation current components of others of the at least two bars are negative.

9. A control device according to claim 2, wherein the computing system is configured to determine the sector of the stator symmetrically so that the maximum distance point is substantially on a middle of the determined sector.

10. A control device according to claim 2, wherein the computing system is configured to determine the maximum distance point based on signals indicative of the position of the rotor.

11. A control device according to claim 1, wherein the computing system is configured to:

determine a first sector of the stator so that the determined first sector comprises a maximum distance point that is a point on a circumference of an airgap surface of the stator where a distance to a rotational axis of the rotor is greatest,
determine a second sector of the stator so that the determined second sector comprises a minimum distance point that is a point on the circumference of the airgap surface of the stator where the distance to the rotational axis of the rotor is smallest, and
control the converter to supply the levitation current components to at least two of the bars of the cage winding which belong to the determined first sector of the stator and to at least two of the bars of the cage winding which belong to the determined second sector of the stator.

12. An electric drive comprising:
a first electric machine comprising a rotor and a stator, the stator comprising a cage winding comprising bars and a conductor ring electrically connecting the bars to each other,
a first converter comprising first terminals connected to first ends of the bars of the cage winding, the first converter being configured to supply first currents to the bars of the cage winding, and
a first control device for controlling the first converter, wherein the first control device comprises a computing system configured to control the first converter to:
supply torque generating current components of the first currents to the bars of the cage winding so that torque is generated in accordance with electric machine control, and
supply levitation current components of the first currents to the bars of the cage winding on the basis of a deviation of a position of the rotor from a reference position so as to control magnetic force directed to the rotor.

13. An electric drive according to claim 12, wherein:
the conductor ring of the cage winding is between the first ends of the bars and second ends of the bars in an axial direction of the electric machine,
the electric drive comprises a second converter comprising second terminals connected to the second ends of the bars, the second converter being configured to supply second currents to the bars, and
the electric drive comprises a second control device for controlling the second converter,
wherein the second control device comprises a computing system configured to control the second converter to:
supply torque generating current components of the second currents to the bars of the cage winding so that torque is generated in accordance with electric machine control, and
supply levitation current components of the second currents to the bars of the cage winding on the basis of a deviation of a position of the rotor from the reference position so as to control magnetic force directed to the rotor.

14. An electric drive according to claim 12, wherein the electric drive comprises:
a second electric machine comprising a rotor connected to the rotor of the first electric machine and a stator comprising a cage winding comprising bars and a conductor ring electrically connecting the bars to each other,
a second converter comprising second terminals connected to first ends of the bars of the cage winding of the second electric machine, the second converter being configured to supply second currents to the bars of the cage winding of the second electric machine, and
a second control device for controlling the second converter,
wherein the second control device comprises a computing system configured to control the second converter to:
supply torque generating current components of the second currents to the bars of the cage winding of the second electric machine so that torque is generated in accordance with electric machine control, and
supply levitation current components of the second currents to the bars of the cage winding of the second electric machine on the basis of a deviation of a position of the rotor of the second electric machine from a reference position so as to control magnetic force directed to the rotor of the second electric machine.

15. An electric drive according to claim 12, wherein the first electric machine is a permanent magnet electric machine, the rotor of the first electric machine comprising permanent magnet material.

16. An electric drive according to claim 12, wherein the first electric machine is a reluctance machine where a direct axis inductance differs from a quadrature axis inductance.

17. An electric drive according to claim 12, wherein the first electric machine is an induction machine, the rotor of the first electric machine comprising a cage winding.

18. An electric drive according to claim 12, wherein the first electric machine comprises cooling channels inside or beside the bars of the cage winding of the first electric machine.

19. A method for controlling an electric drive that comprises:
an electric machine comprising a rotor and a stator, the stator comprising a cage winding comprising bars and a conductor ring electrically connecting the bars to each other, and
a converter comprising terminals connected to first ends of the bars of the cage winding, the converter being configured to supply currents to the bars of the cage winding,
the method comprising:
controlling the converter to supply torque generating current components to the bars of the cage winding so that torque is generated in accordance with electric machine control, and
controlling the converter to supply levitation current components to the bars of the cage winding on the basis of a deviation of a position of the rotor from a reference position so as to control magnetic force directed to the rotor.

20. A non-transitory computer readable medium encoded with a computer program for controlling an electric drive that comprises:
an electric machine comprising a rotor and a stator, the stator comprising a cage winding comprising bars and a conductor ring electrically connecting the bars to each other, and
a converter comprising terminals connected to first ends of the bars of the cage winding, the converter being configured to supply currents to the bars of the cage winding,
the computer program comprising computer executable instructions for controlling a programmable processing system of the electric drive to control the converter to:

supply torque generating current components to the bars of the cage winding so that torque is generated in accordance with electric machine control, and supply levitation current components to the bars of the cage winding on the basis of a deviation of a position of the rotor from a reference position so as to control magnetic force directed to the rotor.

* * * * *